C. L. MERRY.
EYEGLASS MOUNTING.
APPLICATION FILED JAN. 30, 1915.
1,173,982.
Patented Feb. 29, 1916.
Fig. I.
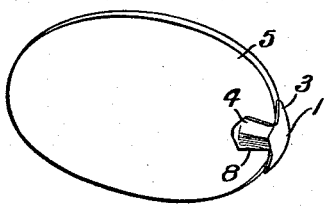
Fig. II.
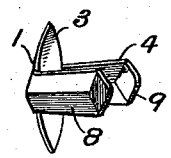
Fig. III.
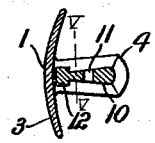
Fig. IV.
Fig. V.
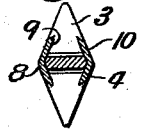
Fig. VI.
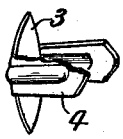
Fig. VII.
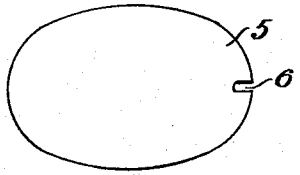
WITNESSES:
Lynn A. Robinson.
Retta T. Thomas
INVENTOR
Charles L. Merry.
BY
Arthur C. Brown
ATTORNEY

UNITED STATES PATENT OFFICE.

CHARLES L. MERRY, OF KANSAS CITY, MISSOURI, ASSIGNOR TO MERRY OPTICAL COMPANY, OF KANSAS CITY, MISSOURI, A CORPORATION OF MISSOURI.

EYEGLASS-MOUNTING.

1,173,982.    Specification of Letters Patent.    Patented Feb. 29, 1916.

Application filed January 30, 1915. Serial No. 5,201.

*To all whom it may concern:*

Be it known that I, CHARLES L. MERRY, a citizen of the United States, residing at Kansas City, in the county of Jackson and State of Missouri, have invented certain new and useful Improvements in Eyeglass-Mountings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to eye-glass and spectacle mountings, and has for its principal object to provide a mounting to which an eye-glass or spectacle lens may be easily and quickly applied, which is sightly in appearance, and which will hold the lens securely to prevent its loss from the mounting or its becoming loosened therefrom, and more particlarly to improved means for combining a keeper wedge with the lens strap of a mounting to effectually attach the mounting to a lens. In accomplishing this object I have provided the improved details of structure hereinafter described and illustrated in the accompanying drawings, wherein:—

Figure I is a perspective view of a preferred form of my improved mounting, illustrating the application of a lens thereto. Fig. II is an enlarged perspective view of one of the mountings, particularly illustrating the keeper sockets in the strap ears. Fig. III is a cross section of the mounting, particularly illustrating the wedge-like construction and the mounting of the keeper. Fig. IV is a detail perspective view of the keeper portion of the mounting. Fig. V is a cross section of the mounting on the line V—V, Fig. III. Fig. VI is a detail perspective view of a mounting comprising a modified form of ear socket and keeper-wedge. Fig. VII is a detail view of an eye-glass or spectacle lens, particularly illustrating the slit for the keeper-wedge.

Referring more in detail to the parts: 1 designates the mounting, which comprises the usual straps 3 and ears 4 for application to the edge and faces of an eye-glass or spectacle lens 5, in the customary manner. The lens 5, which is adapted for use with my improvements, comprises a slit 6 that opens through the edge of the lens along the major axis and is preferably rectangular in outline; the face of the slit being preferably concaved to obviate sharp corners and the resultant tendency to breakage. The sides of the slits 6 are covered by the mounting ears 4 when the lens is assembled in the mounting.

The ears 4 and straps 3 of the mounting are preferably formed in a single piece by stamping the same from suitable metal; the said ears being indented during the stamping operation to form outstanding outer faces 8 and socketed inner faces 9, the indentation being preferably inclined from their edges toward the longitudinal center of the ears and from the outer ends of the ears to enhance the appearance of the mounting, and the sockets in the inner faces of the ears being adapted for receiving a keeper-wedge (presently described) and for providing space for surplus of the solder with which the wedge is attached to the ears and cement with which the mounting is attached to a lens.

Located between the ears 4, with its side edges seated in the ear sockets 9, and preferably soldered to the ears and strap base, is a keeper member 10, preferably of wedge-shape, as illustrated in the drawings, the edges of which are beveled or otherwise shaped to fit snugly within and conform to the shape of the sockets 9 in the ears 4, and the outer end of which is shaped to conform to the contour of the base of the slit 6 in the lens. The keeper is provided with an aperture 11 through which cement may pass and equalize on opposite sides of a lens when the lens is being attached to a mounting. The keeper-wedge is arranged with the point of the wedge directed inwardly toward the lens straps and terminating in a head 12, which is square in cross-section and adapted for filling the space within the lens slit 6 in order to coöperate with the outer base of the wedge in preventing lost motion of the lens and to securely lock the lens to the mounting.

In manufacturing my improvement, the straps and ears are, as heretofore mentioned, stamped from a single piece of material and the sockets formed in the ears during the stamping operation. After the piece is stamped, as described, the ears are bent to lie parallel with each other, with the sockets 9 facing inwardly, and the strap suitably attached to the bridge portion of a mounting. With the strap and ear parts so arranged, the keeper-wedge 10 is then placed between the ears with its head 12 in abutment against the lens strap and soldered in position; the sockets in the ears serving to set the keeper in proper alinement relative to the lens, and thereby obviate the tedious and difficult manual adjustment of the mounting, which would otherwise be required in order to so arrange the keeper as to secure the proper placing of the lens. With the keeper in position the mounting may be distributed to the dealer by a manufacturer and the lens applied to the mounting when required, or the lens may be mounted by the manufacturer. In either event, when the lens is to be applied to the mounting, the slit end of the lens is placed between the ears 4, with the keeper 10 projected into the slit in the lens until the edge of the lens seats flush against the lens straps 3. Prior to the projection of the lens into the mounting, cement is applied to the keeper, the straps and the ears of the mounting, so that when the lens is in place the cement will form a permanent connection between the mounting and lens; the space in the slit left by the wedge-shaped keeper being filled with the cement which, when hardened, forms a locking mass to prevent the removal of the lens from the keeper.

By providing the keeper with a head 12 of the same thickness as the base end of the wedge, the keeper is provided with a four-point bearing against the slit portion of the lens that will prevent lost motion of the lens, and thereby insure against loosening of the cement and eventual displacement of the lens, and by providing the wedge with the opening 11 a passage is provided through which cement may pass from one side of the wedge to the other to equalize the supply in both open spaces in the lens slit and thereby insure an effectual sealing of the parts, and by reason of the fact that the ears are rigidly connected by being soldered to opposite edges of the wedge, a rigid connection is formed therebetween that prevents the ears from spreading and thereby insures positive and permanent rigidity of the mounting.

Having thus described my invention, what I claim as new therein and desire to secure by Letters-Patent, is:—

1. A spectacle or eye-glass mounting comprising socketed ears, and a keeper located between the ears and seated in the socketed portions thereof.

2. A spectacle or eye-glass mounting comprising socketed ears, and a keeper located between the ears and having edges shaped to the contour of and seated in the socketed portions of the ears.

3. A spectacle or eye-glass mounting comprising lens ears having facing sockets, and a keeper member adapted to seat between the ears with its side edges located within the sockets.

4. A spectacle or eye-glass mounting comprising ears having central outstanding portions and inclined side portions on their outer faces, and corresponding indentations in their inner faces, and a keeper member located between the ears and having edges shaped to correspond to and seated within the indentations in said ears.

5. A spectacle or eye-glass mounting comprising lens straps and ears; the said ears being provided with facing sockets, a keeper member located between the ears with its side edges projected into said sockets and its base lying flat against the lens straps.

6. The combination with a lens having a slit therein, of a mounting having straps lying along the edge of the lens and ears lying along the faces thereof and covering the slit; the said ears having sockets in alinement with the lens slit, and a keeper located within the lens slit with its side edges projected into the ear sockets.

7. The combination with a lens having a slit therein provided with a curved base, of a mounting having straps lying along the faces thereof and covering the slit; the said ears having sockets in alinement with the lens slit, and a keeper located within the lens slit with its side edges projected into the ear sockets and having its outer end shaped to fit snugly within the base of the slit.

In testimony whereof I affix my signature in presence of two witnesses.

CHARLES L. MERRY.

Witnesses:
  LYNN A. ROBINSON,
  LETA E. COATS.